United States Patent
Chen et al.

(10) Patent No.: US 11,605,816 B2
(45) Date of Patent: Mar. 14, 2023

(54) LITHIUM SECONDARY BATTERY AND BATTERY MODULE, BATTERY PACK, AND ELECTRIC APPARATUS CONTAINING SAME

(71) Applicant: CONTEMPORARY AMPEREX TECHNOLOGY CO., LIMITED, Ningde (CN)

(72) Inventors: Xingbu Chen, Ningde (CN); Xin Sun, Ningde (CN); Xiao Chen, Ningde (CN); Zhenglun Chen, Ningde (CN); Haotian Xie, Ningde (CN); Bangrun Wang, Ningde (CN); Geng Li, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/874,548

(22) Filed: Jul. 27, 2022

(65) Prior Publication Data
US 2022/0367871 A1    Nov. 17, 2022

Related U.S. Application Data

(63) Continuation of application No. PCT/CN2020/139182, filed on Dec. 24, 2020.

(51) Int. Cl.
| | |
|---|---|
| *H01M 4/525* | (2010.01) |
| *H01M 4/505* | (2010.01) |
| *H01M 4/587* | (2010.01) |
| *H01M 4/58* | (2010.01) |
| *H01M 10/0525* | (2010.01) |
| *H01M 10/0567* | (2010.01) |
| *H01M 4/02* | (2006.01) |

(52) U.S. Cl.
CPC ........... *H01M 4/525* (2013.01); *H01M 4/505* (2013.01); *H01M 4/587* (2013.01); *H01M 4/5825* (2013.01); *H01M 10/0525* (2013.01); *H01M 10/0567* (2013.01); *H01M 2004/021* (2013.01); *H01M 2004/027* (2013.01); *H01M 2004/028* (2013.01); *H01M 2220/20* (2013.01); *H01M 2300/0025* (2013.01)

(58) Field of Classification Search
None
See application file for complete search history.

(56) References Cited

U.S. PATENT DOCUMENTS

2017/0062818 A1    3/2017    Ogata et al.

FOREIGN PATENT DOCUMENTS

| CN | 108807980 A | 11/2018 |
| CN | 111668470 A | 9/2020 |
| CN | 112038574 A | 12/2020 |

OTHER PUBLICATIONS

The World Intellectual Property Organization (WIPO) International Search Report and Written Opinion for PCT/CN2020/139182 dated Sep. 26, 2021 17 pages (with translation).

*Primary Examiner* — Carlos Barcena
(74) *Attorney, Agent, or Firm* — Anova Law Group, PLLC (57) ABSTRACT

A secondary battery includes a positive electrode, a negative electrode, and an electrolyte. The positive electrode includes a positive-electrode active substance layer, the positive-electrode active substance layer contains a pre-lithiation agent, and a molecular formula of the pre-lithiation agent is $Li_xNi_aCu_{1-a-b}M_bO_2$, where $1 \leq x \leq 2$, $0 < a < 1$, and $0 \leq b < 0.1$, and M is selected from one or more of Zn, Sn, Mg, Fe, and Mn. The negative electrode includes a negative-electrode active substance layer including graphite and silicon-containing material. The electrolyte contains fluoroethylene carbonate (FEC). A weight percentage of the pre-lithiation agent in the positive-electrode active substance layer, a weight percentage of silicon content in the negative-electrode active substance layer, and a weight percentage of FEC in the electrolyte satisfy $0.2 \times W_{Si} \leq W_{FEC} \leq 7.5\% - 0.6 \times W_L$.

12 Claims, 3 Drawing Sheets

LITHIUM SECONDARY BATTERY AND BATTERY MODULE, BATTERY PACK, AND ELECTRIC APPARATUS CONTAINING SAME

CROSS-REFERENCE TO RELATED APPLICATION

This application is a continuation of International Application No. PCT/CN2020/139182, filed Dec. 24, 2020, the entire content of which is incorporated herein by reference.

TECHNICAL FIELD

This application pertains to the technical field of lithium secondary batteries, relates to a lithium secondary battery, and in particular, to a lithium secondary battery containing a pre-lithiation agent in a positive electrode active substance layer, and a battery module, a battery pack, and an electric apparatus containing such lithium secondary battery.

BACKGROUND

Lithium secondary batteries have been widely used in many consumer electronic products due to their advantages of high energy density, long cycle life and no memory effect.

In recent years, with the advancement of electric vehicles and energy storage systems, the requirement for energy density of the lithium secondary batteries is also rising.

In addition, silicon material has become a promising negative-electrode material with high energy density for the lithium secondary batteries by virtue of its high theoretical specific capacity. However, because pure silicon material has poor conductivity and a swelling rate of up to 300%, a solid electrolyte interface SEI film formed on a surface of an electrode keeps cracking and repairing, which consumes more lithium, thereby shortening the cycle life of the lithium secondary batteries.

Positive-electrode pre-lithiation is an effective method to compensate for lithium loss. Regarding the positive-electrode pre-lithiation, $Li_5FeO_4$ is a pre-lithiation agent commonly studied at present. Such a lithium-rich material has a high theoretical specific capacity, but other metal ions (such as iron ions) formed after lithium deintercalation will travel to a negative electrode for reduction. Iron precipitation easily damages the SEI film, and may further pierce separators to cause short circuit in batteries, leading to low safety. In addition, after the lithium deintercalation, $Li_5FeO_4$ will release oxygen, causing oxidization of electrolytes and capacity decay of the batteries.

SUMMARY

In view of the foregoing technical problems, this application is intended to provide a lithium secondary battery, including a positive electrode, a negative electrode, and an electrolyte; where the positive electrode includes a positive-electrode active substance layer, the positive-electrode active substance layer contains a pre-lithiation agent, and a molecular formula of the pre-lithiation agent is $Li_xNi_aCu_{1-a-b}M_bO_2$, where $1 \leq x \leq 2$, $0 < a < 1$, and $0 \leq b < 0.1$, and M is selected from one or more of Zn, Sn, Mg, Fe, and Mn;

the negative electrode includes a negative-electrode active substance layer, the negative-electrode active substance layer contains a first negative-electrode active substance and a second negative-electrode active substance, where the first negative-electrode active substance is graphite, and the second negative-electrode active substance is selected from one or more of Si, $SiO_n$ ($0 < n < 2$), and SiC;

the electrolyte contains fluoroethylene carbonate (FEC); and the lithium secondary battery satisfies $0.2 \times W_{Si} \leq W_{FEC} \leq 7.5\% - 0.6 \times W_L$, where $W_{FEC}$ is a weight percentage of the FEC in the electrolyte, $W_{Si}$ is a weight percentage of element silicon contained in the second negative-electrode active substance in the negative-electrode active substance layer, and $W_L$ is a weight percentage of the pre-lithiation agent in the positive-electrode active substance layer.

According to the foregoing structure, the pre-lithiation agent $Li_xNi_aCu_{1-a-b}M_bO_2$ can compensate for lithium consumed for forming and repairing the solid electrolyte interface film SEI. In addition, because the pre-lithiation agent does not contain Fe, iron precipitation that damages the SEI film can be avoided. In addition, fluoroethylene carbonate (FEC) contained in the electrolyte can form a compact SEI film that is hard to crack, so that a capacity decay rate remains low during cycling and a good specific charge and discharge capacity is obtained. However, too much fluoroethylene carbonate (FEC) may worsen gassing, resulting in swelling of an electrode plate and leaching of metal copper from pre-lithiation agent L to worsen self-discharge of the system. Herein, controlling the content of fluoroethylene carbonate (FEC) and the content of the pre-lithiation agent can reduce the battery self-discharge problems caused by precipitation of transition metal ions in the pre-lithiation agent at the negative electrode. According to the lithium secondary battery of the present disclosure, loss of silicon negative-electrode active lithium can be effectively compensated for by controlling weight percentages of fluoroethylene carbonate (FEC), element silicon, and the pre-lithiation agent within the foregoing ranges, so that a capacity decay rate remains low during cycling to increase the cycle life, a good specific charge and discharge capacity is obtained, and a battery self-discharge capacity is reduced.

In any embodiment, $W_L$ and $W_{Si}$ satisfy a condition $-2.2\% \leq W_L - W_{Si} \leq 2.5\%$.

Because an initial coulombic efficiency (a ratio of initial discharge capacity to initial charge capacity) of the secondary battery containing a silicon negative electrode is low, if the silicon content increases, more pre-lithiation agents are required to supplement active lithium.

With the weight percentages of element silicon and the pre-lithiation agent being controlled within the foregoing ranges, loss of silicon negative-electrode active lithium can be effectively compensated for, so that a capacity decay rate remains low during cycling and storage to increase the cycle life and storage life, and obtain a good specific charge and discharge capacity. When $W_L \geq W_{Si} - 2.2\%$, the pre-lithiation agent can supplement sufficient active lithium for the secondary battery containing a silicon negative electrode. In addition, when $W_L \leq W_{Si} + 2.5\%$, the amount of lithium deintercalated from the negative-electrode active substance and the amount of lithium-intercalation vacancies of the positive electrode containing the pre-lithiation agent are proportional, thereby further increasing the specific discharge capacity of the battery.

In any embodiment, $W_L$ is 0.1% to 10%, optionally, $W_L$ is 0.2% to 9%, and further optionally, $W_L$ is 0.3% to 8%. When the added amount is within the foregoing range, the pre-lithiation agent can supplement sufficient active lithium for lithium loss during film forming of the positive and negative electrodes and cycling, and ensure that the negative-electrode active substance and the amount of lithium-intercalation vacancies of the positive electrode containing the pre-lithiation agent are proportional, thereby further increasing the specific discharge capacity of the secondary battery.

In any embodiment, $W_{Si}$ is 0.5 wt % to 10 wt %, optionally, $W_{Si}$ is 1 wt % to 8 wt %, and further optionally, $W_{Si}$ is 1.5 wt % to 6 wt %.

Therefore, with the silicon content being controlled within the foregoing range, the pre-lithiation agent can be added to effectively increase the cycle life and storage life and obtain good specific charge and discharge capacity. In this application, when the Si content of the negative-electrode plate is controlled within the foregoing range, energy density of the secondary battery can be improved. In addition, the amount of the required pre-lithiation agent L can be controlled to increase the cycle life and storage life and address the self-discharge problem of the secondary battery.

In any embodiment, $W_{FEC}$ is 0.1 wt % to 7.5 wt %, optionally, $W_{FEC}$ is 0.5 wt % to 6 wt %, and further optionally, $W_{FEC}$ is 1 wt % to 5 wt %.

Therefore, with the content of fluoroethylene carbonate (FEC) being controlled within the foregoing range, the cycle life can be increased, and the self-discharge capacity can be decreased. This may be because when the content of fluoroethylene carbonate (FEC) is within the foregoing range, a compact SEI film can be formed on the surface of the negative electrode (especially silicon particles) to effectively alleviate interface side reactions between the silicon particles and the electrolyte, thereby increasing the cycle life of the secondary battery. In addition, limiting the maximum content of fluoroethylene carbonate (FEC) can reduce leaching of element copper in the pre-lithiation agent to address the increasing self-discharge rate of the secondary battery.

In any embodiment, a specific surface area $BET_L$ of the pre-lithiation agent is 0.3 m$^2$/g to 10 m$^2$/g, and optionally, $BET_L$ is 0.6 m$^2$/g to 3.5 m$^2$/g.

Therefore, with the specific surface area $BET_L$ of the pre-lithiation agent being controlled within the foregoing range, problems such as gelation during preparation of a positive-electrode plate can be avoided, thereby preventing the decrease of the cycling performance and discharge capacity ratio. In this application, when the specific surface area $BET_L$ of the pre-lithiation agent is within the foregoing range, the pre-lithiation agent does not agglomerate, which alleviates the gelation-prone problem of a positive-electrode slurry, and increases the cycle life of the battery and the specific charge and discharge capacity. In addition, the compatibility between the pre-lithiation agent and the positive-electrode active substance is increased, and capacity performance of the pre-lithiation agent is improved, so that the pre-lithiation agent can further improve the specific charge and discharge capacity.

In any embodiment, median particle size by volume $D_v50_L$ of the pre-lithiation agent is 1 μm to 20 μm, and optionally, $D_v50_L$ is 3 μm to 13 μm.

Therefore, with median particle size by volume $D_v50_L$ of the pre-lithiation agent being controlled within the foregoing range, problems such as gelation during preparation of the positive-electrode plate can be avoided, thereby preventing the decrease of the cycling performance and the discharge capacity ratio. In this application, when median particle size by volume $D_v50_L$ of the pre-lithiation agent is within the foregoing range, the pre-lithiation agent is not prone to agglomeration, so that gelation is not likely to occur in the positive-electrode slurry, thereby increasing the cycle life of the battery and the specific charge and discharge capacity. In addition, the compatibility between the pre-lithiation agent and the positive-electrode active substance is increased, and capacity performance of the pre-lithiation agent is improved, so that the pre-lithiation agent can further improve the specific charge and discharge capacity.

In any embodiment, the positive electrode further includes a positive-electrode active substance, and the positive-electrode active substance includes at least one of compounds represented in formula (I) to formula (III):

$$Li_{1+x1}Ni_{a1}Co_{b1}M'_{1-a1-b1}O_{2-y1}A_{y1} \qquad (I);$$

$$Li_{1+x2}Mn_{a2}M''_{2-a2}O_{4-d}A'_d \qquad (II);$$

$$LiFe_{(1-x3-y3)}Mn_{x3}M'''_{y3}PO_4 \qquad (III);$$

where in formula (I), $-0.1 \le x1 \le 0.2$, $0 < a1 < 1$, $0 \le b1 \le 1$, $0 < a1+b1 < 1$, and $0 \le y1 < 0.2$, M' is selected from one or more of Mn, Fe, Cr, Ti, Zn, V, Al, Zr, and Ce, and A includes one or more of S, N, F, Cl, Br, and I; and optionally, $0.5 \le a < 1$, $0 < b < 0.5$, $0.7 \le a1+b1 < 1$, and $0 \le y \le 0.1$, M' is one or more of Mn and Al, and A is one or more of S and F;

where in formula (II), $-0.1 \le x2 \le 0.2$, $0 < a2 \le 2$, $0 \le d < 1$, and M'' includes one or more of Ni, Fe, Cr, Ti, Zn, V, Al, Mg, Zr, and Ce, and A' includes one or more of S, N, F, Cl, Br, and I;

where in formula (III), $0 \le x3 \le 1$, $0 \le y3 \le 0.1$, and M''' is selected from one or more of transitional metal elements other than Fe and Mn and non-transitional metal elements; and optionally, the positive-electrode active substance includes at least compounds represented by formula (I).

Therefore, the pre-lithiation agent can be used with various positive-electrode active substances to increase the cycle life and storage life, obtain good specific charge and discharge capacity, and reduce the self-discharge capacity of the battery.

In any embodiment, the positive electrode further includes the positive-electrode active substance, the positive-electrode active substance includes a lithium transition metal oxide with a layered structure, and median particle size by volume $D_v50_L$ of the pre-lithiation agent and median particle size by volume $D_v50_N$ of the lithium transition metal oxide satisfy $0.3 \le D_v50_L/D_v50_N \le 3.6$, and optionally, $0.7 \le D_v50_L/D_v50_N \le 3$.

Therefore, with a particle size ratio of the pre-lithiation agent to the lithium transition metal oxide with a layered structure being controlled within the foregoing range, the slurry in the positive-electrode active substance is not prone to gelation and has good stability, and the pre-lithiation agent improves the charge and discharge capacity. In this application, when the particle size ratio of the pre-lithiation agent to the lithium transition metal oxide with a layered structure is within the foregoing range, a positive-electrode material is not prone to gelation, helping increase the cycle life and specific charge and discharge capacity of the secondary battery. In addition, the compatibility between the pre-lithiation agent and the positive-electrode active substance is improved, helping improve the capacity performance of the pre-lithiation agent to further improve the specific charge and discharge capacity.

In any embodiment, the positive electrode further includes the positive-electrode active substance, the positive-electrode active substance includes an olivine-structured lithium-containing phosphate, and median particle size by volume $D_v50_L$ of the pre-lithiation agent and median particle size by volume $D_v50_P$ of the olivine-structured lithium-containing phosphate satisfy $1 \leq D_v50_L/D_v50_P \leq 15$, and optionally, $2.5 \leq D_v50_L/D_v50_P \leq 11$.

Therefore, with a particle size ratio of the pre-lithiation agent and the olivine-structured lithium-containing phosphate being controlled within the foregoing range, the slurry in the positive-electrode active substance is not prone to gelation and has good stability, and the pre-lithiation agent improves the specific charge and discharge capacity.

A second aspect of this application provides a battery module, including the secondary battery in the first aspect of this application.

A third aspect of this application provides a battery pack, including the battery module in the second aspect of this application.

A fourth aspect of this application provides an electric apparatus, including at least one of the secondary battery in the first aspect of this application, the battery module in the second aspect of this application, or the battery pack in the third aspect of this application.

The battery module, the battery pack, and the electric apparatus in this application include the secondary battery provided in this application, and therefore have at least advantages that are the same as those of the secondary battery.

Reference characters are described as follows:
1. battery pack;
2. upper box body;
3. lower box body;
4. battery module;
5. secondary battery;
51. housing;
52. electrode assembly; and
53. top cover assembly.

DESCRIPTION OF EMBODIMENTS

To make the objectives, technical solutions, and advantages of this application clearer, the following describes the embodiments of this application in detail with reference to the accompanying drawings. However, persons of ordinary skill in the art should understand that the embodiments are merely intended for describing the technical solutions and not for limitation.

For brevity, this application specifically discloses some numerical ranges. However, any lower limit may be combined with any upper limit to form an unspecified range, and any lower limit may be combined with another lower limit to form an unspecified range, and likewise, any upper limit may be combined with any other upper limit to form an unspecified range. In addition, each individually disclosed point or single numerical value, as a lower limit or an upper limit, may be combined with any other point or single numerical value or combined with another lower limit or upper limit to form an unspecified range.

In the descriptions of this specification, it should be noted that "more than" or "less than" is inclusive of the present number and that "more" in "one or more" means two or more than two, unless otherwise specified.

The foregoing content of this application is not intended to describe each of the disclosed embodiments or implementations of this application. The following descriptions use examples to illustrate exemplary embodiments in detail. Throughout this application, a series of embodiments are used for providing instructions and the embodiments may be combined in various forms for use. In the examples, enumeration is only representative and should not be interpreted as exhaustive.

Secondary Battery

An embodiment of a first aspect of this application provides a secondary battery. The secondary battery includes a positive-electrode plate, a negative-electrode plate, and an electrolyte. In a battery charging/discharging process, active ions are intercalated and deintercalated between the positive-electrode plate and the negative-electrode plate. The electrolyte conducts ions between the positive-electrode plate and the negative-electrode plate.

[Negative-Electrode Plate]

The negative-electrode plate in this application includes a negative-electrode current collector and a negative-electrode film layer disposed on at least one surface of the negative-electrode current collector, and the negative-electrode film layer includes a negative-electrode active substance.

In the secondary battery of this application, the negative-electrode active substance may include but is not limited to graphite and silicon-based material. The graphite may include artificial graphite, natural graphite, or a mixture thereof. The silicon-based material may be selected from one or more of elemental silicon, silicon-oxygen compounds (such as silicon monoxide), silicon-carbon compounds, silicon-nitrogen compounds, and silicon alloys. These materials are all commercially available. Specifically, the negative-electrode active substance layer contains a first negative-electrode active substance and a second negative-electrode active substance, where the first negative-electrode active substance is graphite, and the second negative-electrode active substance is selected from one or more of Si, $SiO_n$ ($0<n<2$), and SiC.

For example, the negative-electrode current collector includes two opposite surfaces in its thickness direction, and the negative-electrode film layer is disposed on either or both of the two opposite surfaces of the negative-electrode current collector.

In the secondary battery in this application, the negative-electrode current collector may use a metal foil or a composite current collector. For example a copper foil may be used as the metal foil. The composite current collector may include a polymer material basic layer and a metal layer formed on at least one surface of the polymer material matrix. The composite current collector may be formed by forming a metal material (copper, copper alloy, nickel, nickel alloy, titanium, titanium alloy, silver, silver alloy, or the like) on a polymer material matrix (for example, matrices of polypropylene (PP), polyethylene terephthalate (PET), polybutylene terephthalate (PBT), polystyrene (PS), and polyethylene (PE)).

In the secondary battery of this application, the negative electrode film layer usually includes the negative electrode active material, an optional binder, an optional conductive agent, and other optional additives, and is usually formed by being coated with a negative electrode slurry and dried. The negative-electrode slurry is usually obtained by dispersing the negative-electrode active substance and optionally a conductive agent, a binder, or the like in a solvent and stirring uniformly. The solvent may be N-methylpyrrolidone (NMP) or deionized water.

For example, the conductive agent may be selected from more than one of superconducting carbon, acetylene black, carbon black, Ketjen black, carbon dots, carbon nanotubes, graphene, and carbon nanofiber.

For example, the binder may be selected from more than one of styrene butadiene rubber (SBR), polyacrylic acid (PAA), polyacrylic acid sodium (PAAS), polyacrylamide (PAM), polyvinyl alcohol (PVA), sodium alginate (SA), polymethacrylic acid (PMAA), and carboxymethyl chitosan (CMCS).

Other optional additives may be, for example, a thickener (for example, sodium carboxymethyl cellulose (CMC-Na)).

[Positive-Electrode Plate]

The positive-electrode plate includes a positive-electrode current collector and a positive-electrode film layer disposed on at least one surface of the positive-electrode current collector, and the positive-electrode film layer includes the positive-electrode active substance.

The positive-electrode active substance may include at least one of compounds represented in formula (I) to formula (III):

$$Li_{1+x1}Ni_{a1}Co_{b1}M'_{1-a1-b1}O_{2-y1}A_{y1} \quad (I);$$

$$Li_{1+x2}Mn_{a2}M''_{2-a2}O_{4-d}A'_{d} \quad (II); \text{ and}$$

$$LiFe_{(1-x3-y3)}Mn_{x3}M'''_{y3}PO_4 \quad (III);$$

where in formula (I), $-0.1 \leq x1 \leq 0.2$, $0 < a1 < 1$, $0 \leq b1 \leq 1$, $0 < a1+b1 < 1$, and $0 \leq y1 < 0.2$, M' is selected from one or more of Mn, Fe, Cr, Ti, Zn, V, Al, Zr, and Ce, and A includes one or more of S, N, F, Cl, Br, and I; and optionally, $0.5 \leq a1 < 1$, $0 < b1 < 0.5$, $0.7 \leq a1+b1 < 1$, and $0 \leq y < 0.1$, M' is one or more of Mn and Al, and A is one or more of S and F;

where in formula (II), $-0.1 \leq x2 \leq 0.2$, $0 < a2 \leq 2$, $0 \leq d < 1$, and M'' includes one or more of Ni, Fe, Cr, Ti, Zn, V, Al, Mg, Zr, and Ce, and A' includes one or more of S, N, F, Cl, Br, and I;

where in formula (III), $0 \leq x3 \leq 1$, $0 \leq y3 \leq 0.1$, and M''' is selected from one or more of transitional metal elements other than Fe and Mn and non-transitional metal elements.

The positive-electrode plate further contains a pre-lithiation agent L, and a molecular formula of the pre-lithiation agent L is $Li_xNi_aCu_{1-a-b}M_bO_2$, where $1 \leq x \leq 2$, $0 < a < 1$, and $0 \leq b < 0.1$, and M is selected from one or more of Zn, Sn, Mg, Fe, and Mn. Specifically, the pre-lithiation agent L may be a metal oxide with lithium, nickel, and copper as primary components and added with a small amount of one or more of Zn, Sn, Mg, Fe, and Mn.

For example, the positive-electrode current collector includes two back-to-back surfaces in a thickness direction of the positive-electrode current collector, and the positive-electrode film layer is disposed on either or both of the two back-to-back surfaces of the positive-electrode current collector.

In the secondary battery in this application, the positive-electrode current collector may use a metal foil or a composite current collector. For example a copper foil may be used as the metal foil. The composite current collector may include a polymer material basic layer and a metal layer formed on at least one surface of the polymer material basic layer. The composite current collector may be formed by forming a metal material (aluminum, aluminum alloy, nickel, nickel alloy, titanium, titanium alloy, silver, silver alloy, or the like) on a polymer material matrix (for example, matrices of polypropylene (PP), polyethylene terephthalate (PET), polybutylene terephthalate (PBT), polystyrene (PS), and polyethylene (PE)).

The positive-electrode film layer may optionally include a conductive agent. The conductive agent is not limited to a specific type, and may be selected by persons skilled in the art as required. For example, the conductive agent used in the positive-electrode film layer may be selected from more than one of superconducting carbon, acetylene black, carbon black, Ketjen black, carbon dots, carbon nanotubes, graphene, and carbon nanofiber.

The positive-electrode plate in this application may be prepared by using the method known in the art. For example, a positive-electrode active material, the conductive agent, and a binder are dissolved in a solvent (for example, N-methylpyrrolidone (NMP)) to form a uniform positive-electrode slurry; and the positive electrode slurry is applied on a positive-electrode current collector, and processes such as drying and cold pressing are performed to obtain a positive-electrode plate.

[Electrolyte]

In the secondary battery of this application, a type of the electrolyte is not specifically limited, and the electrolyte may be selected according to a requirement. The electrolyte may be selected from at least one of a solid electrolyte or a liquid electrolyte (that is, an electrolyte solution).

In some embodiments, the electrolyte is an electrolyte solution. The electrolyte includes an electrolyte lithium salt and a solvent.

Optionally, the electrolyte lithium salt may be selected from one or more of lithium hexafluorophosphate ($LiPF_6$), lithium tetrafluoroborate ($LiBF_4$), lithium perchlorate (Li-$ClO_4$), lithium hexafluoroarsenate ($LiAsF_6$), lithium bis (fluorosulfonyl)imide (LiFSI), lithium bistrifluoromethanesulfonimide (LiTFSI), lithium trifluoromethanesulfonate (LiTFS), lithium difluoro(oxalato)borate (LiDFOB), lithium dioxalate borate (LiBOB), lithium difluorophosphate ($LiPO_2F_2$), lithium difluoro(dioxalato)phosphate (LiDFOP), and lithium tetrafluoro oxalato phosphate (LiTFOP).

The solvent contains fluoroethylene carbonate (FEC). The fluoroethylene carbonate (FEC) can facilitate film forming at the negative electrode to form a compact solid electrolyte interface film (SEI film).

Optionally, the solvent may further include one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), methylmethyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), tetramethylene sulfone (SF), methyl sulfone (MSM), ethyl methyl sulfone (EMS), and diethyl sulfone (ESE).

In some embodiments, optionally, the electrolyte further includes an additive. For example, the additive may include a negative-electrode film forming additive, or may include a positive-electrode film forming additive, or may include an additive capable of improving some performance of a battery, for example, an additive for improving over-charge performance of the battery, an additive for improving high-temperature performance of the battery, and an additive for improving low-temperature performance of the battery.

[Relationship Between Positive-Electrode Pre-Lithiation Agent, Electrolyte, and Negative-Electrode Silicon Content]

In some embodiments, the lithium secondary battery satisfies $0.2 \times W_{Si} \leq W_{FEC} \leq 7.5\% - 0.6 \times W_L$, where $W_{FEC}$ is a weight percentage of the FEC in the electrolyte, $W_{Si}$ is a weight percentage of element silicon contained in the second negative-electrode active substance in the negative-electrode active substance layer, and $W_L$ is a weight percentage of the pre-lithiation agent L in the positive-electrode active substance layer.

According to the lithium-ion secondary battery, pre-lithiation agent $Li_xNi_aCu_{1-a-b}M_bO_2$ can compensate for lithium consumed for forming and repairing solid electrolyte interface film SEI. In addition, because the pre-lithiation agent does not contain Fe, iron precipitation that damages the SEI film can be avoided. In addition, fluoroethylene carbonate (FEC) contained in the electrolyte can form a compact SEI film that is hard to crack, so that a capacity decay rate remains low during cycling and a good specific charge and discharge capacity is obtained. However, too much fluoroethylene carbonate (FEC) may worsen gassing, resulting in leaching of metal copper from pre-lithiation agent L to worsen self-discharge of the system. Controlling the content of fluoroethylene carbonate (FEC) and the content of the pre-lithiation agent can reduce the battery self-discharge problems caused by precipitation of transition metal ions in the pre-lithiation agent at the negative electrode. According to the lithium secondary battery, with weight ratios of fluoroethylene carbonate (FEC), element silicon, and pre-lithiation agent being controlled within the foregoing ranges, loss of silicon negative-electrode active lithium can be effectively compensated for, so that the capacity decay rate remains low during cycling to increase the cycle life, obtain a good specific charge and discharge capacity, and reduce the self-discharge capacity of the battery. If fluoroethylene carbonate (FEC) is less than $0.2 \times W_{Si}$, film forming at the negative electrode is not sufficient to increase the cycle life. If fluoroethylene carbonate (FEC) is greater than $7.5\% - 0.6 \times W_L$, transition metal ions in the pre-lithiation agent precipitate excessively at the negative electrode, causing the battery self-discharge problem.

In this application, the weight percentage $W_{FEC}$ of FEC in the electrolyte can be measured by using a testing method known in the art. The measurement can be performed with reference to GB/T 9722-2006 chemical reagent general rules for the gas chromatography. For example, gas chromatograph Agilgent 7890B can be used to measure the electrolyte to be injected, or an electrolyte obtained by centrifugation from a finished cell.

In this application, the weight percentage $W_{Si}$ of element silicon in the second negative-electrode active substance in the negative-electrode active substance layer can be measured by using a testing method known in the art. For example, the following method can be used for measurement: an ICAP7400 plasma emission spectroscopy from Thermo Fisher Scientific, USA, is selected for measurement by using an ICP method. The test sample can be a coated and cold-pressed negative-electrode plate, or a negative-electrode plate disassembled from a cell (the cell is left standing for 30 minutes at 25° C., discharged at 0.33 C. constant current to an end-of-discharge voltage of the cell, and then left standing for 30 minutes for full discharge; and the negative-electrode plate is then disassembled from the cell, rinsed properly with DMC solution, and dried for use).

In this application, the weight percentage $W_L$ of the pre-lithiation agent L in the positive-electrode active substance layer can be measured by using a testing method known in the art. For example, the following method can be used for measurement: For a mixed electrode plate of the pre-lithiation agent L and a positive-electrode active substance without element Ni and Cu such as lithium iron phosphate, ICP (for example, an ICAP7400 plasma emission spectroscopy from Thermo Fisher Scientific, USA) test can be used to obtain a value of Ni/Cu and a weight percentage of the pre-lithiation agent L. For a mixed electrode plate of the pre-lithiation agent L and a positive-electrode active substance containing element Ni such as lithium iron phosphate, the ICP (an ICAP7400 plasma emission spectroscopy from Thermo Fisher Scientific, USA) can be used to measure weight percentages of a plurality of elements such as Ni, Co, Mn, and Cu in the positive-electrode plate, perform a mapping test on a surface or a section of the positive-electrode plate in combination with EDS (OXFORD EDS X-max-50 mm$^2$), narrow the range after a copper-rich area (corresponding to the pre-lithiation agent L) is located, and obtain the value of Ni/Cu of the copper-rich area, which is the value of Ni/Cu of the pre-lithiation agent. Then, a weight percentage of material L is obtained based on the weight percentage of each element obtained by ICP.

In some embodiments, $W_L$ and $W_{Si}$ satisfy a condition $-2.2\% \leq W_L - W_{Si} \leq 2.5\%$.

Because an initial coulombic efficiency (a ratio of initial discharge capacity to initial charge capacity) of the secondary battery containing the silicon negative electrodes is low, an increased content of silicon requires more pre-lithiation agent L to compensate for active lithium. With the weight percentages of element silicon and the pre-lithiation agent L being controlled within the foregoing ranges, loss of active lithium in the silicon negative electrode can be effectively compensated for, so that a capacity decay rate remains low during cycling to increase the cycle life and storage life and obtain a good specific charge and discharge capacity. When $W_L \geq W_{Si} - 2.2\%$, the pre-lithiation agent can supplement sufficient active lithium for the secondary battery containing a silicon negative-electrode. In addition, when $W_L \leq W_{Si} + 2.5\%$, the amount of the negative-electrode active substance and the amount of lithium-intercalation vacancies of the positive electrode containing the pre-lithiation agent are proportional, thereby further increasing the discharge specific capacity of the battery.

In some embodiments, $W_L$ is 0.1% to 10%, optionally, $W_L$ is 0.2% to 9%, and further optionally, $W_L$ is 0.3% to 8%. When the added amount is within the foregoing range, the pre-lithiation agent can supplement sufficient active lithium for film forming of the positive and negative electrodes, and ensure that the amount of the negative-electrode active substance and the amount of lithium-intercalation vacancies of the positive electrode containing the pre-lithiation agent are proportional, thereby further increasing the discharge specific capacity of the secondary battery.

In some embodiments, $W_{Si}$ is 0.5 wt % to 10 wt %, optionally, $W_{Si}$ is 1 wt % to 8 wt %, and further optionally, $W_{Si}$ is 1.5 wt % to 6 wt %. With the silicon content being controlled within the foregoing range, the cycle life and storage life can be increased, and a good specific charge and discharge capacity can be obtained. In this application, when the Si content of the negative-negative electrode is within the foregoing range, the energy density, cycle life, and storage life of the secondary battery can be increased. In addition, the used amount of the required pre-lithiation agent L can be controlled to address the self-discharge problem of the secondary battery.

In some embodiments, $W_{FEC}$ is 0.1 wt % to 7.5 wt %, optionally, $W_{FEC}$ is 0.5 wt % to 6 wt %, and further optionally, $W_{FEC}$ is 1 wt % to 5 wt %. With the content of fluoroethylene carbonate (FEC) being controlled within the foregoing range, the cycle life can be increased, and the self-discharge capacity can be reduced. This may be because when the content of fluoroethylene carbonate (FEC) is within the foregoing range, a compact SEI film can be formed on the surface of the negative electrode (especially silicon particles) to effectively alleviate interface side reactions between the silicon particles and the electrolyte, thereby increasing the cycle life of the secondary battery. In addition, leaching of element copper in the pre-lithiation agent is reduced, addressing the increasing self-discharge rate of the secondary battery.

[Pre-Lithiation Agent L]

In some embodiments, a specific surface area $BET_L$ of the pre-lithiation agent L is 0.3 m²/g to 10 m²/g, and optionally, $BET_L$ is 0.6 m²/g to 3.5 m²/g.

The pre-lithiation agent L contains a relatively large amount of lithium, has strong alkalinity, high activity, and large particles, and is reactive with water. Problems such as gelation are likely to occur during preparation of a positive-electrode plate, making a positive-electrode slurry less stable and greatly affecting performance. With the specific surface area $BET_L$ of the pre-lithiation agent being controlled within the foregoing range, gelation can be reduced, the cycle life is further increased, and a good specific charge and discharge capacity is obtained.

In this application, the specific surface area of the pre-lithiation agent L can be measured by using a testing method known in the art. For a specific test method and steps, reference may be made to GB/T 19587-2004 "Determination of specific surface area of solid substances by gas adsorption BET method". For example, NOVA 2000e can be used, and the following procedure can be used for measurement: (1) A given amount of sample (for example, 2.0 g-15.0 g) was taken; (2) The sample is put into a sample tube and placed in a heating bag for degassing processing (degassing is performed at 200° C. for 2 hours); (3) After degassing is completed and a temperature of a degassing station decreases to a room temperature, the sample tube is removed from the degassing station and a total mass of the sample is weighed; (4) A filling rod was put into the sample tube to measure a specific surface area of the sample.

In some embodiments, median particle size by volume $D_v50_L$ of the pre-lithiation agent is 1 μm to 20 μm, and optionally, $D_v50_L$ is 3 μm to 13 μm. With the median particle size by volume of the pre-lithiation agent being controlled within the foregoing range, gelation can be reduced, the cycle life is ensured, and a good specific charge and discharge capacity is obtained.

In this application, median particle size by volume $D_v50_L$ of the lithium pre-lithiation agent L can be measured by using a testing method known in the art. For example, the following method can be used for measurement: referring to GB/T 19077-2016 particle size distribution laser diffraction method, a laser particle size analyzer (for example, Malvern Mastersizer 2000E, UK) is used for measurement. For a positive-electrode plate that has been mixed with the pre-lithiation agent L, a scanning electron microscope (SEM, ZEISS SEM Sigma 300) and ion polishing cross-sectional topography analysis (CP) can be used to measure maximum visible particle sizes of the pre-lithiation agent L from a number of selected areas (for example, more than 20 areas). An average value is then obtained to characterize median particle size by volume $D_v50_L$ of the pre-lithiation agent L.

In some embodiments, the positive-electrode active substance includes a lithium transition metal oxide with a layered structure, and median particle size by volume $D_v50_L$ of the pre-lithiation agent and median particle size by volume $D_v50_N$ of the lithium transition metal oxide satisfy $0.3 \leq D_v50_L/D_v50_N \leq 3.6$, and optionally, $0.7 \leq D_v50_L/D_v50_N \leq 3$. Controlling a ratio of median particle size by volume of the pre-lithiation agent and median particle size by volume of the lithium transition metal oxide within the foregoing range can reduce gelation, ensure the cycle life, and obtain good specific charge and discharge capacity. In this application, when the particle size ratio of the pre-lithiation agent to the lithium transition metal oxide with a layered structure is within the foregoing range, a positive-electrode material is not prone to gelation, helping increase the cycle life and specific charge and discharge capacity of the secondary battery. In addition, the compatibility between the pre-lithiation agent and the positive-electrode active substance is improved, helping improve the capacity performance of the pre-lithiation agent to further improve the specific charge and discharge capacity.

In this application, the particle size ratio of median particle size by volume $D_v50_L$ of the pre-lithiation agent L to median particle size by volume $D_v50_N$ of the lithium transition metal oxide, $D_v50_L/D_v50_N$, can be measured by using a testing method known in the art. For example, the following method can be used for measurement: For powder grade, GB/T 19077-2016 particle size distribution laser diffraction method may be used as a reference. $D_v50$ of the pre-lithiation agent L and $D_v50$ of the positive-electrode active substance each can be obtained by using a laser particle size analyzer (for example, Malvern Mastersizer 2000E, UK), and then a particle size ratio is obtained. For a positive-electrode plate that has been mixed with the pre-lithiation agent L, a scanning electron microscope (SEM, ZEISS SEM Sigma 300) and ion polishing cross-sectional topography analysis (CP) can be used to measure maximum visible particle sizes of the pre-lithiation agent L and the positive-electrode active substance from a number of selected areas (for example, more than 20 areas). Average values obtained separately are then used to characterize particle size ratio of median particle size by volume $D_v50_L$ of the pre-lithiation agent L and median particle size by volume $D_v50_N$ of the positive-electrode active substance, $D_v50_L/D_v50_N$.

In some embodiments, the positive-electrode active substance includes an olivine-structured lithium-containing phosphate, and median particle size by volume $D_v50_L$ of the pre-lithiation agent and median particle size by volume $D_v50_P$ of the olivine-structured lithium-containing phosphate satisfy $1 \leq D_v50_L/D_v50_P \leq 15$, and optionally, $2.5 \leq D_v50_L/D_v50_P \leq 11$. With the median particle size by volume of the pre-lithiation agent being controlled within the foregoing range, gelation can be reduced, the cycle life is ensured, and a good specific charge and discharge capacity is obtained.

In this application, the particle size ratio of median particle size by volume $D_v50_L$ of the pre-lithiation agent L and median particle size by volume $D_v50_P$ of the lithium transition metal oxide, $D_v50_L/D_v50_P$, can be measured by referring to the foregoing measurement method of $D_v50_L/D_v50_P$.

[Separator]

In some embodiments, the secondary battery further includes a separator. The separator is disposed between the positive-electrode plate and the negative-electrode plate to provide separation. A type of the separator is not particularly limited for the secondary battery in this application, and any well-known separator with a porous structure used for the secondary battery can be selected. For example, the separator may be selected from one or more of a glass fiber film, a non-woven film, a polyethylene film, a polypropylene film, a polyvinylidene fluoride film, and a multilayer composite film including one or more of them.

In some embodiments, the secondary battery may include an outer package. The outer package is used to package the positive-electrode plate, the negative-electrode plate, and the electrolyte.

In some embodiments, the outer package of the secondary battery may be a hard shell, for example, a hard plastic shell, an aluminum shell, or a steel shell. The outer package of the secondary battery may alternatively be a soft pack, for example, a soft pouch. A material of the soft pack may be plastic, for example, one or more of polypropylene (PP), polybutylene terephthalate (PBT), and polybutylene succinate (PBS).

The secondary battery may be prepared by using a method well-known in the art. For example, the positive-electrode plate, the separator, and the negative-electrode plate are made into an electrode assembly through winding or lamination, where the separator is sandwiched between the positive-electrode plate and the negative-electrode plate for isolation; and the electrode assembly is placed in the outer package, and the electrolyte is injected, followed by sealing, to obtain the secondary battery.

Figure 1:
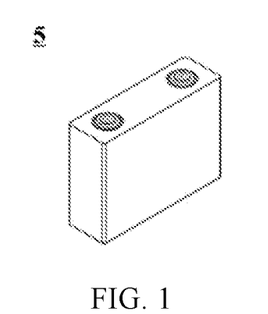
FIG. 1 is a schematic diagram of a secondary battery according to an embodiment of this application.

This application has no specific limitation on a shape of the secondary battery, and the secondary battery may be cylindrical, rectangular, or of any other shape. FIG. 1 shows a secondary battery 5 of a rectangular structure as an example.

Figure 2:
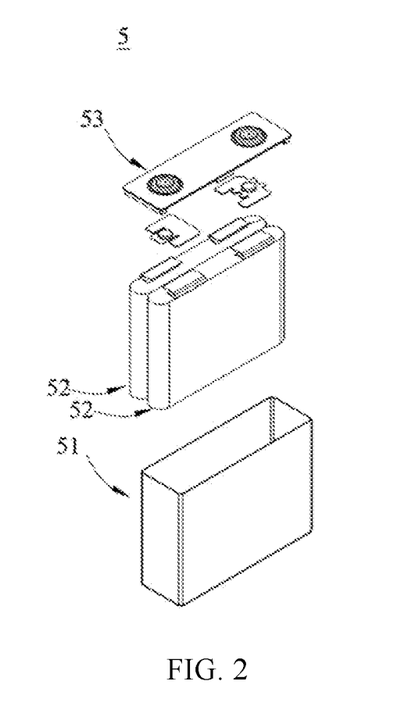
FIG. 2 is an exploded view of the secondary battery according to the embodiment of this application in FIG. 1.

In some embodiments, referring to FIG. 2, the outer package may include a housing 51 and a cover plate 53. The housing 51 may include a base plate and a side plate connected onto the base plate, and the base plate and the side plate enclose an accommodating cavity. The housing 51 has an opening communicating with the accommodating cavity, and the cover plate 53 can cover the opening to close the accommodating cavity. A positive-electrode plate, a negative-electrode plate, and a separator can be made into an electrode assembly 52 through winding or lamination. The electrode assembly 52 is packaged in the accommodating cavity. The electrolyte is infiltrated into the electrode assembly 52. There may be one or more electrode assemblies 52 in the secondary battery 5, and the quantity may be adjusted as required.

In some embodiments, secondary batteries may be assembled into a battery module, and the battery module may include a plurality of secondary batteries. A specific quantity may be adjusted based on application and capacity of the battery module.

Figure 3:
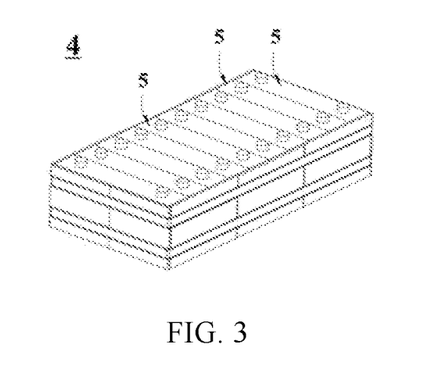
FIG. 3 is a schematic diagram of a battery module according to an embodiment of this application.

FIG. 3 shows a battery module 4 as an example. Referring to FIG. 3, in the battery module 4, a plurality of secondary batteries 5 may be sequentially arranged in a length direction of the battery module 4. Certainly, the secondary batteries may alternatively be arranged in any other manner. Further, the plurality of secondary batteries 5 may be fastened through fasteners.

Optionally, the battery module 4 may further include a housing with an accommodating space, and the plurality of secondary batteries 5 are accommodated in the accommodating space.

In some embodiments, the battery modules may be further assembled into a battery pack, and a quantity of battery modules included in the battery pack may be adjusted based on application and capacity of the battery pack.

Figure 4:
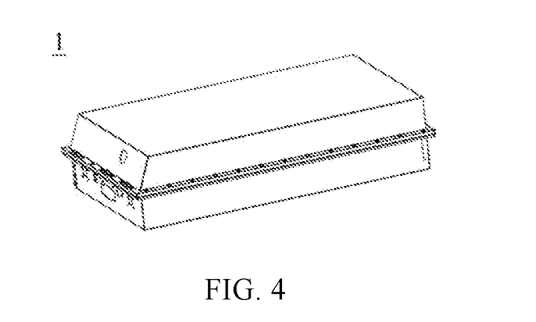
FIG. 4 is a schematic diagram of a battery pack according to an embodiment of this application.
Figure 5:
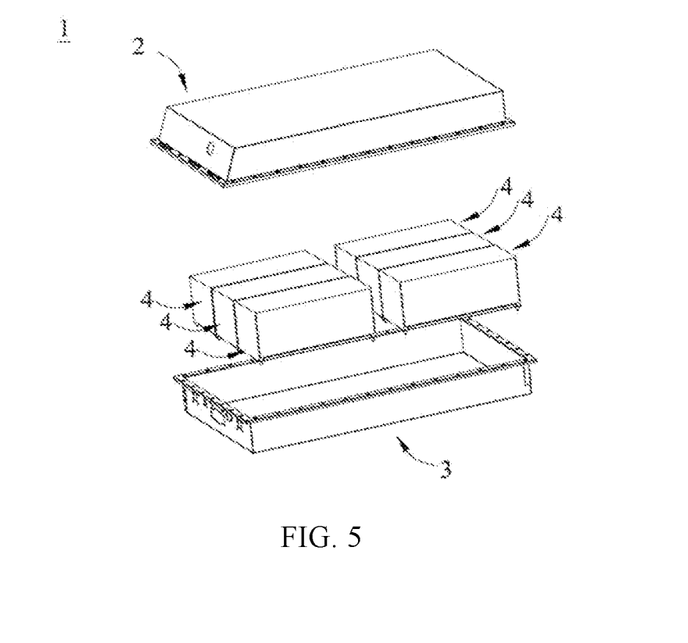
FIG. 5 is an exploded view of the battery pack according to the embodiment of this application in FIG. 4.

FIG. 4 and FIG. 5 show a battery pack 1 as an example. Referring to FIG. 4 and FIG. 5, the battery pack 1 may include a battery box and a plurality of battery modules 4 arranged in the battery box. The battery box includes an upper box body 2 and a lower box body 3. The upper box body 2 can cover the lower box body 3 and form an enclosed space for accommodating the battery modules 4. The plurality of battery modules 4 may be arranged in the battery box in any manner.

Electric Apparatus

Another aspect of this application provides an electric apparatus, where the electric apparatus includes at least one of the secondary battery, the battery module, or the battery pack provided in this application. The secondary battery may be used as a power source of the electric apparatus, and may also be used as an energy storage unit of the electric apparatus. The electric apparatus may be, but is not limited to, a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

The secondary battery, the battery module, or the battery pack may be selected for the electric apparatus based on requirements for using the electric apparatus.

Figure 6:
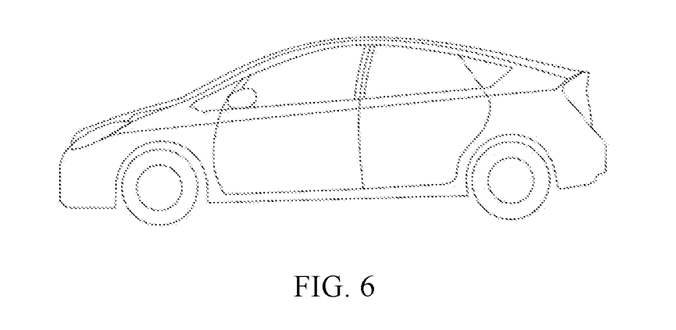
FIG. 6 is a schematic diagram of an apparatus using the secondary battery in the embodiment of this application as a power source.

FIG. 6 shows an electric apparatus as an example. The electric apparatus is a battery electric vehicle, a hybrid electric vehicle, a plug-in hybrid electric vehicle, or the like. To meet a requirement of the electric apparatus for high power and high energy density of the secondary battery, a battery pack or a battery module may be used.

In another example, the electric apparatus may be a mobile phone, a tablet computer, a notebook computer, or the like. The electric apparatus is usually required to be light and thin, and the secondary battery may be used as a power source.

EXAMPLES

The following describes Examples in this application. The examples described below are exemplary and only used to explain this application, but cannot be understood as a limitation of this application. Examples whose technical solutions or conditions are not specified are made based on technical solutions or conditions described in documents in the art, or made based on the product specification. The reagents or instruments used are all conventional products that can be purchased on the market if no manufacturer is indicated. The content of each composition in the examples of this disclosure is measured by weight, unless otherwise specified.

Example 1

Preparation of Negative-Electrode Plate

Graphite, silicon monoxide (a weight percentage of element silicon in the negative-electrode active substance layer is 3%), a binder styrene-butadiene rubber (SBR), and a thickener sodium carboxymethyl cellulose (CMC) were fully stirred and mixed in deionized water at a weight ratio of 94:3:2:1, to form a uniform negative-electrode slurry; and the negative-electrode slurry was applied on a surface of a copper foil negative-electrode current collector, followed by drying, cold pressing, slitting, and cutting, to obtain a negative-electrode plate.

Preparation of Positive-Electrode Plate

The positive-electrode active material lithium nickel cobalt manganese oxide $LiNi_{0.8}Co_{0.1}Mn_{0.1}O_2$ (NCM811, median particle size $D_v50$ is 4.3 μm), the pre-lithiation agent $LiNi_{0.4}Cu_{0.55}Mg_{0.05}O_2$ (a weight percentage of the pre-lithiation agent in the positive-electrode active substance layer is 3%, a specific surface area is 0.99 $m^2/g$, and median particle size $D_v50$ is 8 μm), a conductive agent acetylene black, and a binder polyvinylidene fluoride (PVDF) were fully stirred and mixed in a solvent NMP at a weight ratio of 93.5:3:2:1.5, to form a uniform positive-electrode slurry; and the positive-electrode slurry was applied on a surface of an aluminum foil of a positive-electrode current collector, followed by drying and cold pressing, to obtain a positive-electrode plate.

Preparation of Electrolyte

Ethylene carbonate (EC) and diethyl carbonate (DEC) were mixed at a weight ratio of 50:50, and then $LiPF_6$ was uniformly dissolved in the foregoing solution to obtain an electrolyte, where a concentration of $LiPF_6$ was 1.1 mol/L. An additive of fluoroethylene carbonate (FEC) with a weight percentage of 0.6% was added to the electrolyte.

Preparation of Secondary Battery

The positive-electrode plate, the separator, and the negative-electrode plate were stacked in order, so that the separator was placed between positive and negative electrodes for isolation, and winding was performed to obtain a bare cell. The bare cell was placed in the outer package, the prepared electrolyte was injected, and then the outer package was sealed.

Examples 2 to 6 and Comparative Examples 1 to 4

Preparation methods of Examples 2 to 6 and Comparative Examples 1 to 4 are similar to that of Example 1, but product parameters of the positive-electrode active substance (lithium iron phosphate was used in Examples 3 to 5 and Comparative Examples 3 to 4, with median particle size $D_v50$ being 1.2 μm), content of the pre-lithiation agent, Si content of the negative electrode, and FEC content in the electrolyte are adjusted. For details of different product parameters, refer to Table 1.

Tests

1. Measurement of Median Particle Size by Volume $D_v50$ of Powder Material:

Referring to GB/T 19077-2016 particle size distribution laser diffraction method, a laser particle size analyzer (for example, Malvern Mastersizer 2000E, UK) was used for measurement.

2. Measurement of Specific Surface Area of Powder Material:

Reference standard: GB/T 19587-2004 "Determination of specific surface area of solid substances by gas adsorption BET method". NOVA 2000e was used, and the following procedure was used for measurement: (1) A given amount of sample (for example, 2.0 g-15.0 g) was taken. (2) The sample was put into a sample tube and placed in a heating bag for degassing processing (degassing was performed at 200° C. for 2 hours). (3) After degassing was completed and a temperature of a degassing station decreased to a room temperature, the sample tube was removed from the degassing station and a total mass of the sample was weighed. (4) A filling rod was put into the sample tube to measure a specific surface area of the sample.

3. Specific Charge and Discharge Capacity Test:

After being assembled, the battery was charged to 4.25 V at a rate of 0.05 C., 0.1 C., and 0.33 C. separately at room temperature, and then charged to a rate of 0.05 C. at a constant voltage of 4.25 V. An initial charge capacity of the battery was recorded. The battery was then discharged to 2.8 V with a constant current at a rate of 0.33 C. A discharge capacity of the battery was recorded.

The specific charge and discharge capacity of the battery in the tables of the examples is calculated according to the following formula:

$$\text{Specific charge and discharge capacity} = \frac{\text{Charge and discharge capacity}}{\text{Active substance weight}}(mAh/g)$$

4. Two-Day Storage Voltage Drop Test:

The battery was charged to 3.85 V with a constant current at a rate of 0.33 C. at room temperature, then charged to a rate of 0.05 C. at a constant voltage of 3.85 V, and was left standing for 2 days at room temperature. An open-circuit voltage V2 of the battery was tested after 2 days.

A voltage drop of the battery per hour was calculated according to the following formula:

$$K = \frac{(3.85 - V2) * 1000}{48}(mV/h)$$

5. Test of Cycle Life:

The battery was charged to 4.25 V with a constant current at a rate of 0.33 C. at room temperature, and then charged to a rate of 0.05 C. at a constant voltage of 4.25 V. The battery was then discharged to 2.8 V with a constant current at a rate of 0.33 C. This is regarded as a cycle. The foregoing cycle test was repeated and stopped until the discharge capacity decayed to 80% of the initial capacity. The number of cycles was obtained.

6. Test of Storage Life:

Test process of storage life: (1) Test of initial capacity→(2) Full charge→(3) Storage at 60° C.→(4) Test of capacity→(5) Repeat steps (3) and (4) until reversible capacity decays to 80% of the initial capacity. The storage life, in days, is then recorded.

Step (2) (Full charge): The battery was charged to 4.25 V with a constant current at a rate of 0.33 C. at room temperature, and then charged to a rate of 0.05 C. at a constant voltage of 4.25 V.

Steps (1) and (4) (Test of capacity): The battery was fully charged according to Step (2), and discharged to 2.8 V at a rate of 0.33 C. A reversible capacity was recorded $C_n$, and an initial capacity was recorded as $C_0$.

Step (3) (Storage at 60° C.): The fully charged battery was put in a 60° C. thermostat. Every 15 days or 30 days, the battery was taken out to test the reversible capacity.

Capacity retention rate of the battery stored at 60° C. was calculated according to the following formula:

$$\varepsilon = \frac{(C_n - C_0) * 100\%}{C_0}$$

7. Test of Gelation in Slurry:

The pre-lithiation agent L with different $D_v50_L$, an active substance (LFP or NCM), a conductive agent acetylene black, and a binder polyvinylidene fluoride (PVDF) were fully stirred and mixed in an N-methylpyrrolidone solvent system at an appropriate weight ratio, sealed by plastic wrap, and left standing for one day. Then whether gelation occurred in the slurry was observed.

The foregoing test was performed in Examples 1 to 6 and Comparative Examples 1 to 4. Test results are shown in Table 2.

TABLE 2

| Number | 2-day storage voltage drop (mV/h) (self-discharge) | Cycle life (cycles) | Specific charge capacity (mAh/g) | Specific discharge capacity (mAh/g) |
|---|---|---|---|---|
| Comparative Example 1 | 0.021 | 800 | 249.2 | 206.9 |
| Comparative Example 2 | 0.099 | 2000 | 248.8 | 205.4 |
| Comparative Example 3 | 0.023 | 1300 | 163.1 | 141.4 |
| Comparative Example 4 | 0.114 | 2800 | 162.9 | 139.4 |
| Example 1 | 0.027 | 1200 | 249.3 | 207.1 |
| Example 2 | 0.030 | 1500 | 249.7 | 207.0 |
| Example 3 | 0.064 | 1900 | 249.1 | 206.5 |
| Example 4 | 0.025 | 1500 | 163.5 | 141.7 |
| Example 5 | 0.038 | 2200 | 163.3 | 141.6 |
| Example 6 | 0.073 | 2600 | 162.8 | 140.8 |

According to Tables 1 and 2, the secondary batteries in Examples 1 to 6 satisfy $0.2 \times W_{Si} \leq W_{FEC} \leq 7.5\% - 0.6 \times W_L$,

TABLE 1

| Number | Positive electrode | | | | | | |
|---|---|---|---|---|---|---|---|
| | Active substance | Active substance $D_V50$ (μm) | Component of pre-lithiation agent | $W_L$ | $BET_L$ (m²/g) | $D_V50_L$ (μm) | Ratio of particle size L to positive-electrode particle size |
| Comparative Example 1 | NCM811 | 4.3 | $LiNi_{0.4}Co_{0.55}Mn_{0.05}O_2$ | 3% | 0.99 | 8 | 1.9 |
| Comparative Example 2 | NCM811 | 4.3 | $LiNi_{0.4}Co_{0.55}Mn_{0.05}O_2$ | 3% | 0.99 | 8 | 1.9 |
| Comparative Example 3 | LFP | 1.2 | $LiNi_{0.4}Co_{0.55}Mn_{0.05}O_2$ | 4% | 0.99 | 8 | 6.7 |
| Comparative Example 4 | LFP | 1.2 | $LiNi_{0.4}Co_{0.55}Mn_{0.05}O_2$ | 4% | 0.99 | 8 | 6.7 |
| Example 1 | NCM811 | 4.3 | $LiNi_{0.4}Co_{0.55}Mn_{0.05}O_2$ | 3% | 0.99 | 8 | 1.9 |
| Example 2 | NCM811 | 4.3 | $LiNi_{0.4}Co_{0.55}Mn_{0.05}O_2$ | 3% | 0.99 | 8 | 1.9 |
| Example 3 | NCM811 | 4.3 | $LiNi_{0.4}Co_{0.55}Mn_{0.05}O_2$ | 3% | 0.99 | 8 | 1.9 |
| Example 4 | LFP | 1.2 | $LiNi_{0.4}Co_{0.55}Mn_{0.05}O_2$ | 4% | 0.99 | 8 | 6.7 |
| Example 5 | LFP | 1.2 | $LiNi_{0.4}Co_{0.55}Mn_{0.05}O_2$ | 4% | 0.99 | 8 | 6.7 |
| Example 6 | LFP | 1.2 | $LiNi_{0.4}Co_{0.55}Mn_{0.05}O_2$ | 4% | 0.99 | 8 | 6.7 |

| | Negative electrode | | | | |
|---|---|---|---|---|---|
| Number | Active substance | $W_{Si}$ | $W_{FEC}$ | $0.2 \times W_{Si} \leq W_{FEC} \leq 7.5\% - 0.6 \times W_L$ | $-2.2\% \leq W_L - W_{Si} \leq 2.5\%$ |
| Comparative Example 1 | Graphite/Si | 3% | 0.4% | 0.6% to 5.7% | Yes |
| Comparative Example 2 | Graphite/Si | 3% | 6.5% | 0.6% to 5.7% | Yes |
| Comparative Example 3 | Graphite/Si | 3% | 0.4% | 0.6% to 5.1% | Yes |
| Comparative Example 4 | Graphite/Si | 3% | 5.5% | 0.6% to 5.1% | Yes |
| Example 1 | Graphite/Si | 3% | 0.6% | 0.6% to 5.7% | Yes |
| Example 2 | Graphite/Si | 3% | 2.0% | 0.6% to 5.7% | Yes |
| Example 3 | Graphite/Si | 3% | 5.5% | 0.6% to 5.7% | Yes |
| Example 4 | Graphite/Si | 3% | 0.6% | 0.6% to 5.1% | Yes |
| Example 5 | Graphite/Si | 3% | 2.0% | 0.6% to 5.1% | Yes |
| Example 6 | Graphite/Si | 3% | 5.0% | 0.6% to 5.1% | Yes | where $W_{FEC}$ is a weight percentage of the FEC in the electrolyte, $W_{Si}$ is a weight percentage of element silicon contained in the second negative-electrode active substance in the negative-electrode active substance layer, and $W_L$ is a weight percentage of the pre-lithiation agent in the positive-electrode active substance layer. In the secondary batteries in Examples 1 to 6, 2-day storage voltage drop (mV/h) (self-discharge) stays low, cycle life stays long, and a high specific charge and discharge capacity can be obtained. In addition, according to Examples 1 to 6, no matter whether the positive-electrode active substance is lithium nickel cobalt manganese oxide or lithium iron phosphate, secondary batteries that satisfy the foregoing relation can have good self-discharge performance, long cycle life, and high specific charge and discharge capacity. This is because pre-lithiation agent $Li_xNi_aCu_{1-a-b}M_bO_2$ can compensate for lithium consumed for forming and repairing the solid electrolyte interface film SEI. In addition, because the pre-lithiation agent does not contain Fe, iron precipitation that damages the SEI film can be avoided. In addition, fluoroethylene carbonate (FEC) contained in the electrolyte can form a compact SEI film that is hard to crack, so that a capacity decay rate remains low during cycling and a good specific charge and discharge capacity is obtained. However, too much fluoroethylene carbonate (FEC) may worsen gassing, resulting in swelling of an electrode plate and leaching of metal copper from pre-lithiation agent L to worsen self-discharge of the system. Controlling the content of fluoroethylene carbonate (FEC) and the content of the pre-lithiation agent can reduce the battery self-discharge problems caused by precipitation of transition metal ions in the pre-lithiation agent at the negative electrode.

However, in Comparative Example 1, the content of FEC in the electrolyte is too low to form a compact SEI film at the negative electrode, causing a decrease in the cycle life and specific discharge capacity. In Comparative Example 2, the content of FEC in the electrolyte is excessively high, causing the transition metal ions in the pre-lithiation agent to precipitate at the negative electrode. As a result, the 2-day storage voltage drop is excessively large, a self-discharge problem occurs, and the specific charge and discharge capacity is low. Similar problems occur in Comparative Examples 3 and 4 in which lithium iron phosphate is used as a positive-electrode active substance.

Examples 7 to 18

Preparation methods of Examples 7 to 18 are similar to those of Example 1, but product parameters including the content of the pre-lithiation agent, Si content of the negative electrode, and FEC content in the electrolyte are adjusted. For details of different product parameters, refer to Table 3.

The foregoing test was performed in Examples 7 to 18, with the test results shown in Table 4.

TABLE 3

| | Positive electrode | | | | | | |
|---|---|---|---|---|---|---|---|
| Number | Active substance | Active substance $D_V50_N$ (μm) | Component of pre-lithiation agent | $W_L$ | $BET_L$ (m²/g) | $D_V50_L$ (μm) | $D_V50_L/D_V50_N$ |
| Example 7 | NCM811 | 4.3 | $LiNi_{0.4}Co_{0.55}Mn_{0.05}O_2$ | 0.1% | 0.99 | 8 | 1.9 |
| Example 8 | NCM811 | 4.3 | $LiNi_{0.4}Co_{0.55}Mn_{0.05}O_2$ | 0.2% | 0.99 | 8 | 1.9 |
| Example 9 | NCM811 | 4.3 | $LiNi_{0.4}Co_{0.55}Mn_{0.05}O_2$ | 0.3% | 0.99 | 8 | 1.9 |
| Example 10 | NCM811 | 4.3 | $LiNi_{0.4}Co_{0.55}Mn_{0.05}O_2$ | 1.0% | 0.99 | 8 | 1.9 |
| Example 11 | NCM811 | 4.3 | $LiNi_{0.4}Co_{0.55}Mn_{0.05}O_2$ | 5.5% | 0.99 | 8 | 1.9 |
| Example 12 | NCM811 | 4.3 | $LiNi_{0.4}Co_{0.55}Mn_{0.05}O_2$ | 2.0% | 0.99 | 8 | 1.9 |
| Example 13 | NCM811 | 4.3 | $LiNi_{0.4}Co_{0.55}Mn_{0.05}O_2$ | 6.0% | 0.99 | 8 | 1.9 |
| Example 14 | NCM811 | 4.3 | $LiNi_{0.4}Co_{0.55}Mn_{0.05}O_2$ | 8.0% | 0.99 | 8 | 1.9 |
| Example 15 | NCM811 | 4.3 | $LiNi_{0.4}Co_{0.55}Mn_{0.05}O_2$ | 9.0% | 0.99 | 8 | 1.9 |
| Example 16 | NCM811 | 4.3 | $LiNi_{0.4}Co_{0.55}Mn_{0.05}O_2$ | 10.0% | 0.99 | 8 | 1.9 |
| Example 17 | NCM811 | 4.3 | $LiNi_{0.4}Co_{0.55}Mn_{0.05}O_2$ | 0.5% | 0.99 | 8 | 1.9 |
| Example 18 | NCM811 | 4.3 | $LiNi_{0.4}Co_{0.55}Mn_{0.05}O_2$ | 6.0% | 0.99 | 8 | 1.9 |

| | Negative electrode | | | | |
|---|---|---|---|---|---|
| Number | Active substance | $W_{Si}$ | $W_{FEC}$ | $0.2 \times W_{Si} \leq W_{FEC} \leq 7.5\% - 0.6 \times W_L$ | $-2.2\% \leq W_L - W_{Si} \leq 2.5\%$ |
| Example 7 | Graphite/Si | 0.5% | 2.0% | 0.1% to 7.44% | −0.4% |
| Example 8 | Graphite/Si | 1.0% | 2.0% | 0.2% to 7.38% | −0.8% |
| Example 9 | Graphite/Si | 2.0% | 2.0% | 0.4% to 7.32% | −1.7% |
| Example 10 | Graphite/Si | 3.0% | 2.0% | 0.6% to 6.9% | −2.0% |
| Example 11 | Graphite/Si | 3.0% | 2.0% | 0.6% to 4.2% | 2.5% |
| Example 12 | Graphite/Si | 1.5% | 2.0% | 0.3% to 6.3% | 0.5% |
| Example 13 | Graphite/Si | 6.0% | 2.0% | 1.2% to 3.9% | 0.0% |
| Example 14 | Graphite/Si | 10.0% | 2.0% | 2.0% to 2.7% | −2.0% |
| Example 15 | Graphite/Si | 8.0% | 2.0% | 1.6% to 2.1% | 1.0% |
| Example 16 | Graphite/Si | 7.5% | 1.5% | 1.5% to 1.5% | 2.5% |

TABLE 3-continued

| | | | | | |
|---|---|---|---|---|---|
| Example 17 | Graphite/Si | 3.0% | 2.0% | 0.6% to 7.2% | −2.5% |
| Example 18 | Graphite/Si | 3.0% | 2.0% | 0.6% to 3.9% | 3.0% |

TABLE 4

| Number | 2-day storage voltage drop (mV/h) (self-discharge) | Storage life (days) | Cycle life (cycles) | Specific charge capacity (mAh/g) | Specific discharge capacity (mAh/g) |
|---|---|---|---|---|---|
| Example 7 | 0.013 | 600 | 1700 | 243.7 | 207.3 |
| Example 8 | 0.013 | 580 | 1650 | 244.0 | 206.6 |
| Example 9 | 0.014 | 550 | 1550 | 244.2 | 205.4 |
| Example 10 | 0.019 | 550 | 1400 | 246.2 | 205.2 |
| Example 11 | 0.034 | 700 | 1800 | 253.7 | 206.0 |
| Example 12 | 0.022 | 650 | 1800 | 248.1 | 207.8 |
| Example 13 | 0.04 | 600 | 1500 | 255.3 | 206.3 |
| Example 14 | 0.056 | 550 | 1400 | 258.5 | 203.2 |
| Example 15 | 0.066 | 650 | 1600 | 261.4 | 204.0 |
| Example 16 | 0.078 | 700 | 1750 | 264.8 | 202.4 |
| Example 17 | 0.015 | 500 | 1300 | 244.7 | 204.5 |
| Example 18 | 0.037 | 750 | 1900 | 254.6 | 205.4 |

According to Tables 3 and 4, the secondary batteries in Examples 7 to 16 satisfy −2.2%≤$W_L$-$W_{Si}$≤2.5%, and satisfy that $W_L$ is 0.1% to 10% and $W_{Si}$ is 0.5 wt % to 10 wt %. When $W_L$ and $W_{Si}$ satisfy the foregoing relation, good storage life and cycle life can be obtained. This is because an initial coulombic efficiency (a ratio of initial discharge capacity to initial charge capacity) of the secondary battery containing the silicon negative electrodes is low, if the silicon content increases, more pre-lithiation agents are required to compensate for active lithium. With the weight percentages of element silicon and the pre-lithiation agent being controlled within the foregoing ranges, loss of silicon negative-electrode active lithium can be effectively compensated for, so that a capacity decay rate remains low during cycling and storage to increase the cycle life and storage life, and a good specific charge and discharge capacity is obtained. In addition, as the content of the pre-lithiation agent L increases, specific charge capacity tends to increase. In addition, as the content of Si increases, the specific discharge capacity in Examples 14 to 16 only decreases slightly because the pre-lithiation agent L that satisfies the foregoing relation exists.

Examples 19 to 24

Preparation methods of the secondary batteries in Examples 19 to 24 are similar to that in Example 2, but product parameters including the specific surface area of the pre-lithiation agent and particle size $D_v50$ are adjusted. For details of different product parameters, refer to Table 5.

The foregoing test was performed in Examples 19 to 24, with the test results shown in Table 6.

TABLE 5

| | Positive electrode | | | | | | |
|---|---|---|---|---|---|---|---|
| Example number | Active substance | Active substance $D_V50_N$ (μm) | Component of pre-lithiation agent | $W_L$ | $BET_L$ (m²/g) | $D_V50_L$ (μm) | $D_v50_L$/$D_v50_N$ |
| Example 19 | NCM811 | 4.3 | $LiNi_{0.4}Co_{0.55}Mn_{0.05}O_2$ | 3% | 7.61 | 1.5 | 0.3 |
| Example 20 | NCM811 | 4.3 | $LiNi_{0.4}Co_{0.55}Mn_{0.05}O_2$ | 3% | 3.27 | 3.1 | 0.7 |
| Example 21 | NCM811 | 4.3 | $LiNi_{0.4}Co_{0.55}Mn_{0.05}O_2$ | 3% | 0.63 | 12.6 | 2.9 |
| Example 22 | NCM811 | 4.3 | $LiNi_{0.4}Co_{0.55}Mn_{0.05}O_2$ | 3% | 0.52 | 15.5 | 3.6 |
| Example 23 | NCM811 | 4.3 | $LiNi_{0.4}Co_{0.55}Mn_{0.05}O_2$ | 3% | 9.36 | 1.0 | 0.2 |
| Example 24 | NCM811 | 4.3 | $LiNi_{0.4}Co_{0.55}Mn_{0.05}O_2$ | 3% | 0.39 | 17.9 | 4.2 |

| | Negative electrode | | | | |
|---|---|---|---|---|---|
| Example number | Active substance | $W_{Si}$ | $W_{FEC}$ | 0.2 × $W_{Si}$ ≤ $W_{FEC}$ ≤ 7.5% − 0.6 × $W_L$ | −2.2% ≤ $W_L$ − $W_{Si}$ ≤ 2.5% |
| Example 19 | Graphite/Si | 3% | 2.0% | Yes | Yes |
| Example 20 | Graphite/Si | 3% | 2.0% | Yes | Yes |
| Example 21 | Graphite/Si | 3% | 2.0% | Yes | Yes |
| Example 22 | Graphite/Si | 3% | 2.0% | Yes | Yes |
| Example 23 | Graphite/Si | 3% | 2.0% | Yes | Yes |
| Example 24 | Graphite/Si | 3% | 2.0% | Yes | Yes |

TABLE 6

| Number | Gelation status in slurry preparation (after 24-hour standing) | Cycle life (cycles) | Specific charge capacity (mAh/g) | Specific discharge capacity (mAh/g) |
|---|---|---|---|---|
| Example 19 | Slight gelation | 1300 | 248.4 | 205.9 |
| Example 20 | No gelation | 1500 | 249.9 | 207.0 |
| Example 21 | No gelation | 1550 | 249.2 | 206.9 |
| Example 22 | No gelation | 1600 | 248.7 | 206.1 |
| Example 23 | Gelation | 800 | 244.4 | 196.8 |
| Example 24 | No gelation | 1600 | 246.4 | 204.3 |

According to Tables 5 and 6, in the secondary batteries in Examples 19 to 22, $BET_L$ is 0.5 m²/g to 8 m²/g, median particle size by volume $D_v50_L$ is 1.3 μm to 16 μm. No gelation or slight gelation occurs in the positive-electrode slurry, and a good cycle life and specific charge and discharge capacity can be obtained. This is because the pre-lithiation agent within the foregoing range is not prone to agglomeration, and the slurry is stable. The obtained secondary battery can have excellent cycle life and specific charge and discharge capacity. In addition. in the secondary batteries in Examples 19 to 22, median particle size by volume $D_v50_L$ of the pre-lithiation agent and median particle size by volume $D_v50_N$ of the lithium transition metal oxide satisfy $0.3 \leq D_v50_L/D_v50_N \leq 3.6$. With the particle size ratio being controlled within the foregoing range, the slurry in the positive-electrode active substance is not prone to gelation and has good stability, and the pre-lithiation agent also improves the charge and discharge capacity, so that a long cycle life and good charge and discharge capacity can be obtained.

Examples 25 to 30

Preparation methods of the secondary batteries in Examples 25 to 30 are similar to that in Example 5, but product parameters including the specific surface area of the pre-lithiation agent and particle size $D_v50$ are adjusted. For details of different product parameters, refer to Table 7.

The foregoing test was performed in Examples 25 to 30, with the test results shown in Table 8.

TABLE 8

| Number | Gelation status in slurry preparation (after 24-hour standing) | Cycle life (cycles) | Specific charge capacity (mAh/g) | Specific discharge capacity (mAh/g) |
|---|---|---|---|---|
| Example 25 | Slight gelation | 1800 | 162.4 | 140.1 |
| Example 26 | No gelation | 2200 | 163.6 | 141.5 |
| Example 27 | No gelation | 2250 | 163.1 | 141.0 |
| Example 28 | No gelation | 2300 | 162.7 | 140.6 |
| Example 29 | Gelation | 1000 | 158.7 | 136.2 |
| Example 30 | No gelation | 2300 | 162.2 | 139.6 |

According to Tables 7 and 8, in the secondary batteries in Examples 25 to 28, median particle size by volume $D_v50_L$ of the pre-lithiation agent and median particle size by volume $D_v50_P$ of the olivine-structured lithium-containing phosphate satisfy $1 \leq D_v50_L/D_v50_P \leq 15$. With the particle size ratio being controlled within the foregoing range, the slurry in the positive-electrode active substance is not prone to gelation and has good stability, and the pre-lithiation agent also improves the charge and discharge capacity, so that a long cycle life and good charge and discharge capacity can be obtained.

A person of ordinary skill in the art should understand that the foregoing examples are part of specific examples for implementing this disclosure, and in practical applications, various changes and modifications may be made regarding forms and details of the embodiments and fall within the scope of this application.

The invention claimed is:

1. A lithium secondary battery, comprising: a positive electrode, a negative electrode, and an electrolyte; wherein the positive electrode comprises a positive-electrode active substance layer, the positive-electrode active substance layer contains a pre-lithiation agent, and a molecular formula of the pre-lithiation agent is $Li_xNi_aCu_{1-a-b}M_bO_2$, wherein $1 \leq x \leq 2$, $0 < a < 1$, and $0 \leq b < 0.1$, and M is selected from one or more of Zn, Sn, Mg, Fe, and Mn;

the negative electrode comprises a negative-electrode active substance layer, the negative-electrode active

TABLE 7

| | Positive electrode | | | | | | |
|---|---|---|---|---|---|---|---|
| Number | Active substance | Active substance $D_v50_P$ (μm) | Component of pre-lithiation agent | $W_L$ | $BET_L$ (m²/g) | $D_v50_L$ (μm) | $D_v50_L/D_v50_P$ |
| Example 25 | LFP | 1.2 | $LiNi_{0.4}Co_{0.55}Mn_{0.05}O_2$ | 3% | 7.61 | 1.5 | 1.3 |
| Example 26 | LFP | 1.2 | $LiNi_{0.4}Co_{0.55}Mn_{0.05}O_2$ | 3% | 3.27 | 3.1 | 2.6 |
| Example 27 | LFP | 1.2 | $LiNi_{0.4}Co_{0.55}Mn_{0.05}O_2$ | 3% | 0.63 | 12.6 | 10.5 |
| Example 28 | LFP | 1.2 | $LiNi_{0.4}Co_{0.55}Mn_{0.05}O_2$ | 3% | 0.39 | 17.9 | 14.9 |
| Example 29 | LFP | 1.2 | $LiNi_{0.4}Co_{0.55}Mn_{0.05}O_2$ | 3% | 9.36 | 1.0 | 0.8 |
| Example 30 | LFP | 1.2 | $LiNi_{0.4}Co_{0.55}Mn_{0.05}O_2$ | 3% | 0.32 | 19.4 | 16.2 |

| | Negative electrode | | | | |
|---|---|---|---|---|---|
| Number | Active substance | $W_{Si}$ | $W_{FEC}$ | $0.2 \times W_{Si} \leq W_{FEC} \leq 7.5\% - 0.6 \times W_L$ | $-2.2\% \leq W_L - W_{Si} \leq 2.5\%$ |
| Example 25 | Graphite/Si | 3% | 2.0% | Yes | Yes |
| Example 26 | Graphite/Si | 3% | 2.0% | Yes | Yes |
| Example 27 | Graphite/Si | 3% | 2.0% | Yes | Yes |
| Example 28 | Graphite/Si | 3% | 2.0% | Yes | Yes |
| Example 29 | Graphite/Si | 3% | 2.0% | Yes | Yes |
| Example 30 | Graphite/Si | 3% | 2.0% | Yes | Yes | substance layer contains a first negative-electrode active substance and a second negative-electrode active substance, wherein the first negative-electrode active substance is graphite, and the second negative-electrode active substance is selected from one or more of Si, $SiO_n$ (0<n<2), and SiC;

the electrolyte contains fluoroethylene carbonate (FEC); and the lithium secondary battery satisfies $0.2 \times W_{Si} \leq W_{FEC} \leq 7.5\% - 0.6 \times W_L$, wherein $W_{FEC}$ is a weight percentage of the FEC in the electrolyte, $W_{Si}$ is a weight percentage of element silicon contained in the second negative-electrode active substance in the negative-electrode active substance layer, and $W_L$ is a weight percentage of the pre-lithiation agent in the positive-electrode active substance layer.

2. The lithium secondary battery according to claim 1, wherein $W_L$ and $W_{Si}$ satisfy a condition $-2.2\% \leq W_L - W_{Si} \leq 2.5\%$.

3. The lithium secondary battery according to claim 1, wherein $W_L$ is 0.1% to 10%.

4. The lithium secondary battery according to claim 1, wherein $W_{Si}$ is 0.5 wt % to 10 wt %.

5. The lithium secondary battery according to claim 1, wherein $W_{FEC}$ is 0.1 wt % to 7.5 wt %.

6. The lithium secondary battery according to claim 1, wherein a specific surface area $BET_L$ of the pre-lithiation agent is 0.3 $m^2/g$ to 10 $m^2/g$.

7. The lithium secondary battery according to claim 1, wherein median particle size by volume $D_v50_L$ of the pre-lithiation agent is 1 μm to 20 μm.

8. The lithium secondary battery according to claim 1, wherein the positive electrode further includes a positive-electrode active substance, and the positive-electrode active substance includes at least one of compounds represented by formula (I) to formula (III):

$$Li_{1+x1}Ni_{a1}Co_{b1}M'_{1-a1-b1}O_{2-y1}A_{y1} \quad (I);$$

$$Li_{1+x2}Mn_{a2}M''_{2-a2}O_{4-d}A'_d \quad (II); \text{ and}$$

$$LiFe_{(1-x3-y3)}Mn_{x3}M'''_{y3}PO_4 \quad (III);$$

wherein in formula (I), $-0.1 \leq x1 \leq 0.2$, $0 < a1 < 1$, $0 \leq b1 \leq 1$, $0 < a1+b1 < 1$, and $0 \leq y1 < 0.2$, M' is selected from one or more of Mn, Fe, Cr, Ti, Zn, V, Al, Zr, and Ce, and A includes one or more of S, N, F, Cl, Br, and I;

wherein in formula (II), $-0.1 \leq x2 \leq 0.2$, $0 < a2 \leq 2$, $0 \leq d < 1$, and M'' includes one or more of Ni, Fe, Cr, Ti, Zn, V, Al, Mg, Zr, and Ce, and A' includes one or more of S, N, F, Cl, Br, and I;

wherein in formula (III), $0 \leq x3 \leq 1$, $0 \leq y3 \leq 0.1$, and M''' is selected from one or more of transitional metal elements other than Fe and Mn and non-transitional metal elements.

9. The lithium secondary battery according to claim 1, wherein the positive electrode further includes a positive-electrode active substance, the positive-electrode active substance includes a lithium transition metal oxide with a layered structure, and median particle size by volume $D_v50_L$ of the pre-lithiation agent and median particle size by volume $D_v50_N$ of the lithium transition metal oxide satisfy $0.3 \leq D_v50_L/D_v50_N \leq 3.6$.

10. The lithium secondary battery according to claim 1, wherein the positive electrode further includes a positive-electrode active substance, the positive-electrode active substance includes an olivine-structured lithium-containing phosphate, and median particle size by volume $D_v50_L$ of the pre-lithiation agent and median particle size by volume $D_v50_P$ of the olivine-structured lithium-containing phosphate satisfy $1 \leq D_v50_L/D_v50_P \leq 15$.

11. An electric apparatus, comprising the lithium secondary battery according to claim 1, the lithium secondary battery being used as a power source of the electric apparatus.

12. A battery module, comprising a lithium secondary battery including:

a positive electrode including a positive-electrode active substance layer, the positive-electrode active substance layer containing a pre-lithiation agent, and a molecular formula of the pre-lithiation agent is $Li_xNi_aCu_{1-a-b}M_bO_2$, wherein $1 \leq x \leq 2$, $0 < a < 1$, and $0 \leq b < 0.1$, and M is selected from one or more of Zn, Sn, Mg, Fe, and Mn;

a negative electrode including a negative-electrode active substance layer, the negative-electrode active substance layer containing a first negative-electrode active substance and a second negative-electrode active substance, the first negative-electrode active substance being graphite, and the second negative-electrode active substance being selected from one or more of Si, $SiO_n$ (0<n<2), and SiC; and an electrolyte containing fluoroethylene carbonate (FEC);

wherein the lithium secondary battery satisfies $0.2 \times W_{Si} \leq W_{FEC} \leq 7.5\% - 0.6 \times W_L$, wherein $W_{FEC}$ is a weight percentage of the FEC in the electrolyte, $W_{Si}$ is a weight percentage of element silicon contained in the second negative-electrode active substance in the negative-electrode active substance layer, and $W_L$ is a weight percentage of the pre-lithiation agent in the positive-electrode active substance layer.

* * * * *